Sept. 30, 1952  G. LUNDQUIST  2,611,990
TRAP FOR RATS AND OTHER RODENTS
Filed May 27, 1949  2 SHEETS—SHEET 1

INVENTOR
GUST LUNDQUIST
BY
Williamson & Williamson
ATTORNEYS

Sept. 30, 1952
G. LUNDQUIST
2,611,990
TRAP FOR RATS AND OTHER RODENTS
Filed May 27, 1949
2 SHEETS—SHEET 2
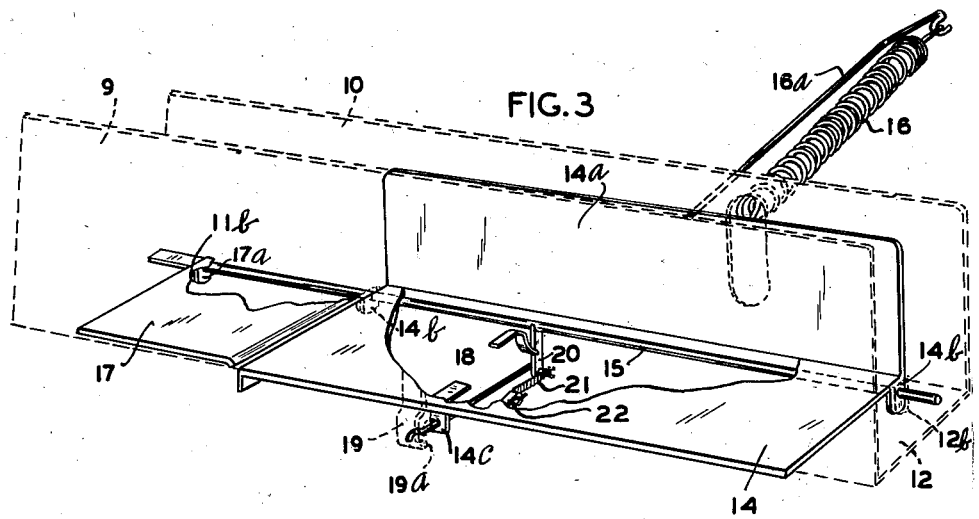
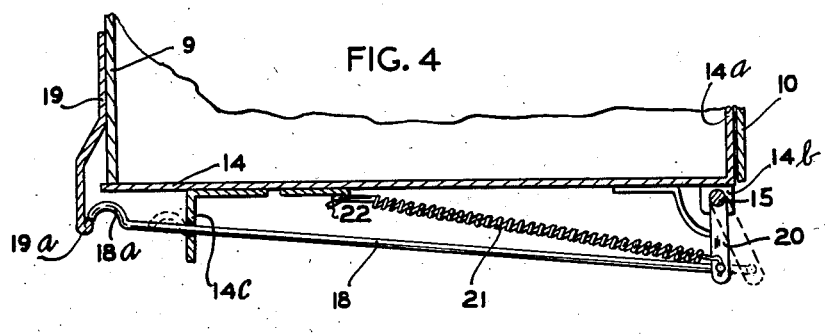
INVENTOR
GUST LUNDQUIST
BY
*Williamson & Williamson*
ATTORNEYS Patented Sept. 30, 1952

2,611,990

UNITED STATES PATENT OFFICE 2,611,990

TRAP FOR RATS AND OTHER RODENTS

Gust Lundquist, Seattle, Wash.

Application May 27, 1949, Serial No. 95,660

6 Claims. (Cl. 43—70).

This invention relates to traps for effectively catching cautious rodents such as rats.

For years the problem of exterminating rats and other disease-carrying rodents in metropolitan areas has been serious. Rats particularly, are very cautious animals and are very agile and often escape from numerous traps now on the market, upon initial warning of the tripping thereof.

The present invention is an improvement upon the inventions disclosed in my co-pending applications, Serial Numbers 637,322 filed December 27, 1945, and 62,874 filed December 1, 1948. Application, Serial Number 637,322 has developed into Patent Number 2,501,282, issued March 21, 1950.

It is an object of my present invention to provide an improved, simple and highly efficient trap for rats and other rodents which will operate with substantially 100% performance where a rodent enters the trapping chamber.

More specifically, it is an object to provide an improved trap wherein the rodent attracted by the smell of bait, enters a narrow preferably horizontal passage open to light at both ends thereof and is supported and assumes a position on an elongated trap floor before the tripping mechanism is contacted, thereby having its entire body disposed upon the trap platform before the trip mechanism is released.

A further object is the provision of an improved trap of the class described wherein the platform in tripping, tilts upon a hinge axis disposed longitudinally thereof rather than transversely and wherein an upstanding expelling flange prevents the rodent from jumping or clinging to one side of the casing wherein the platform is mounted.

Another object is the provision of a simplified trap wherein after fully placing itself upon a trap platform, the rodent trips this platform for instantaneous dropping by the most delicate application of pressure by the fore paws upon a narrow section disposed just ahead of the bait.

Still another object is the provision of a unitary trapping mechanism which is adapted to be installed in various housings or containers and cooperatively associated therewith to form a complete trap.

These and other objects and advantages of my invention will more fully appear from the following description made in connection with the accompanying drawings wherein like reference characters refer to similar parts throughout the several views and in which:

Fig. 3 is a perspective view of the unitary trapping mechanism detached, the side walls of the passage being indicated in dotted lines; and Fig. 4 is a fragmentary cross sectional view on a somewhat larger scale of the trapping mechanism shown in Fig. 3, illustrating the delicately actuated trip mechanism for releasing the trap platform.

Figure 1:
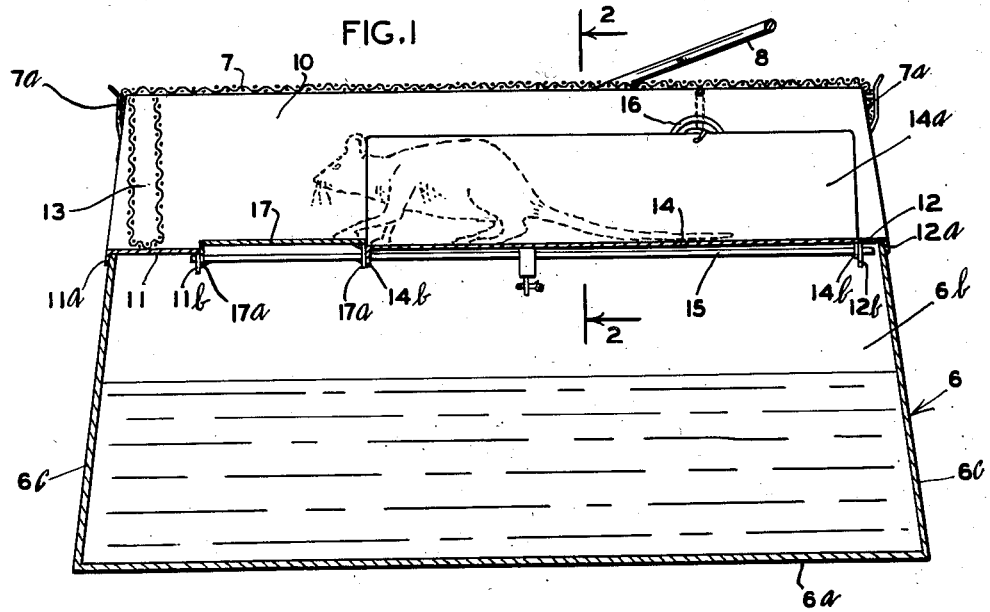
Fig. 1 is a vertical section taken longitudinally through an embodiment of my invention.
Figure 2:
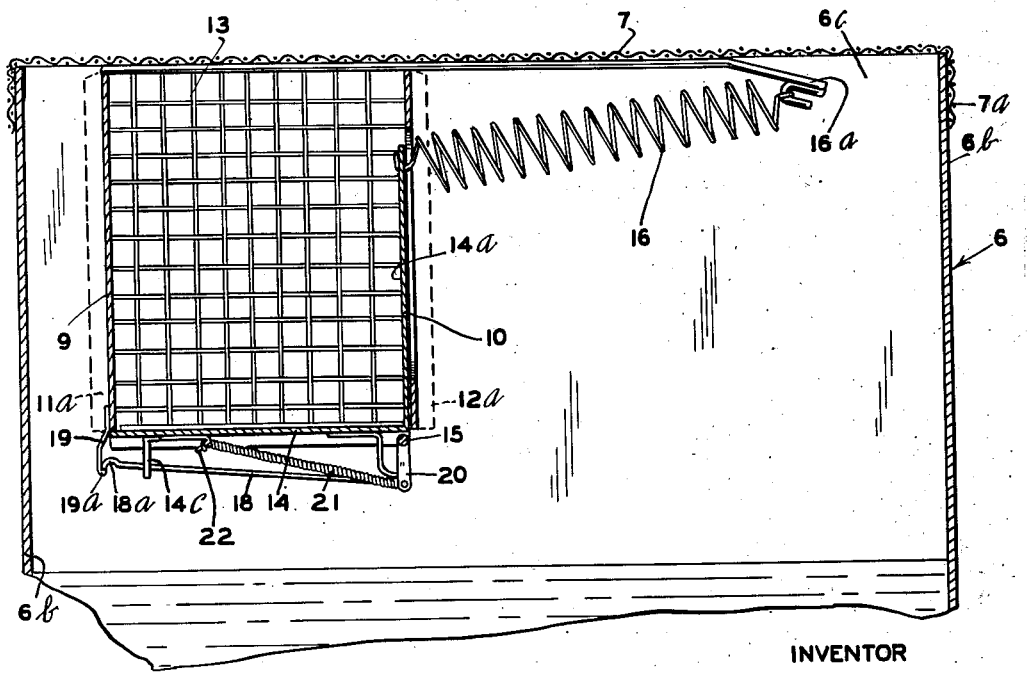
Fig. 2 is a fragmentary cross sectional view on a larger scale taken substantially along the line 2—2 of Fig. 1.

In the form of the invention shown in the drawings, my trap mechanism is cooperatively associated with a housing or container 6 having as shown, an imperforate bottom 6a and imperforate side walls 6b and end walls 6c. The lower portion of the container is adapted to contain liquid such as water or a solution containing poison and the upper end of the container, as shown is covered by a removable grill such as a heavy wire netting 7 having a down-turned flange 7a which is adapted to fit over the upper edges of the container wall. A handle or bail 8 is swingably connected with the central upper portion of container 6. The upper portion of the container below grill 7 is longitudinally divided by a pair of elongated, vertical partitions 9 and 10 to form a lane extending horizontally and longitudinally across the full length of the container. Partitions 9 and 10 may be integrally formed or otherwise rigidly interconnected by horizontal bottom strips 11 and 12 which are supported at the left and right hand ends of the container as viewed in Fig. 1, suitable rectangular, aligned recesses being formed in the container ends 6c to accommodate the unit or casing formed by partitions 9 and 10 and the interconnecting bottom strips 11 and 12. The said unit, as shown, has out-turned flanges 11a and 12a at its ends, for engagement with the edges of the recessed portions of the container ends to retain the unit in operative position. A foraminous upstanding bait holder 13 is affixed within one end of the said unit by attachment to the bottom strip 11 and to the side partitions 9 and 10. As shown, said bait holder is in the form of a U-shaped holder constructed of stiff wire netting and is disposed transversely of the unit and forms a grating or closure for one end of the lane.

I provide an elongated trap platform 14 normally maintained in horizontal position and constituting the main portion of the bottom of the trapping chamber from the inner edge of bottom strip 12 to a point removed a few inches inwardly of the inner face of the bait holder 13. The trap platform 14 is of a length in excess of the length of the largest rodent for which the trap is intended so that the entire length of their bodies may be fully supported thereon before it is tripped. Trap platform 14 as shown, has integrally formed therewith, an upstanding, longitudinal expeller flange 14a which is of greater height than the height of the rodents to be trapped when they are crawling. The trap platform is hinged for free swinging movement on a longitudinal axis preferably although not necessarily adjacent one of the longitudinal edges thereof. To this end as shown, the platform and expeller are provided with a pair of depending pivot ears 14b which are apertured to rotatably engage a longitudinally extending horizontal shaft 15 which in turn is journaled on depending lugs 11b and 12b integrally formed or otherwise rigidly affixed to the bottom strips 11 and 12 of the unit. The trap platform is normally urged to closed, horizontal position by a light contractile spring 16, one end of which is secured substantially centrally to the upper portion of the expeller flange 14a and the outer end of which is secured to an outer rigger bracket 16a which is fixed transversely to the top edges of the partitions 9 and 10 of the unit and which extends transversely of the container in a substantially horizontal direction.

Mounted between the inner end of the trap platform 14 and the inner end of the bottom strip and positioned with working clearance therefrom is a trip panel 17 as shown, comprising a metal plate of slightly lesser width than the lane between the partitions 9 and 10 and affixed at one of its edges to the horizontal shaft 15. As shown, the panel 17 has a pair of down-turned ears 17a which are soldered or otherwise rigidly connected with shaft 15. Panel 17 is constructed and positioned to normally be disposed substantially at the same level or slightly above the level of the platform 14.

A latch rod 18 is mounted transversely beneath the trap platform 14 with its outer end slidably supported in a depending lug 14c affixed to the bottom of platform 14 adjacent the free edge thereof and at a point intermediate of the length thereof. Rod 18 as shown, terminates at its outer end in an upwardly curved latch extremity 18a which is adapted to engage the turned edge or detent 19a of a depending bracket 19 affixed to the partition 9 adjacent the lower edge and central portion thereof. Latch rod 18 is actuated by a short bell crank arm 20 which is affixed to the horizontal shaft 15 to which the trip panel 17 is rigidly secured. Panel 17 and latch rod 18 are urged to normal positions, as shown in full lines in the drawing, by yieldable means such as the light contractile spring 21, one end of which is connected with the lower end of bell crank arm 20 and the other end of which is connected as shown, with a hook 22 affixed appropriately to the intermediate bottom portion of the trap platform 14.

From the foregoing, it will be seen that the entire trapping mechanism including the partitions and bottom strips shown in dotted lines in Fig. 3 is in the form of a bodily removable unit which can be quickly lifted and removed from the casing 6 after the top netting 7 has been taken off. It will of course be understood that this removable unit may be applied to various containers, cages or housings which in cooperation therewith, form a top for the lane defined between partitions 9 and 10 as well as a pen or tank for imprisoning the trapped rodent.

In use, food attractive to the rats or other rodents to be trapped, is disposed within bait holder 13 through the open upper end thereof and the odors from this bait penetrate the lane defined between partitions 9 and 10 and also arise from the top of the trap. The trap is automatically set by action of the coil springs 16 and 21, the first or larger spring 16 swinging the trap platform upwardly into normal, horizontal position and the spring 21 urging the latch rod 18 outwardly during swinging of the platform. The upwardly curved, outer extremity of rod 18 causes the rod to be cammed inwardly to overlie the retaining detent 19a.

In baiting the trap where it is intended to catch rats or other wary rodents, care should be taken to put in the food and handle the casings and other portions of the trap with gloves, so that no human scents will be left in the trap.

Rats and other rodents attracted by the smell of food will peer into the two open ends of the trapping passage and in many instances, will jump to the top grating 7 of the trap, peering at the food within the bait holder and attempting to get at it, until they find the open end of the lane (the right hand end as viewed in Fig. 1), when they will crawl into the longitudinal trapping passage. The lane defined between the partitions 9 and 10 is purposely narrow so that the rodent will crawl forwardly without fear since the opposite end of the line also admits light. The trap platform is supported in horizontal position by the latch mechanism until the trip mechanism is actuated. It is necessary for the rodent to have the full length of its body overlying and supported upon the platform 14 before it can actuate the tripping mechanism.

Being attracted by the smell and sight of the food in bait holder 13, the rodent moves forward, usually cautiously and places one of its front paws or both, or its nose upon the trip panel 17. A very slight pressure imposed upon said panel swings this panel downwardly against the very light action of coil spring 21, rocking the shaft 15 slightly and thereby, through the bell crank arm 20, withdrawing the latch arm 18 from engagement with its detent. The relatively heavy weight of the animal then swings trap platform 14 downwardly on the axis of the shaft 15 and the animal drops into the container below. The tripping action is instantaneous and in the action, the expeller flange 14a at the hinged side of the trap platform prevents the rodent from jumping to the side of the lane and actually assists in the expelling of the animal downwardly. When the weight of the rodent is removed, the trip mechanism immediately resets itself actuated by the spring 16. In this connection, it will be noted that the width of the trap platform is slightly greater than the width of the lane whereby the free edge of the platform is abutted against the lower edge of partition 9 in its normal closed position.

From the foregoing description, it will be seen that I have provided a simple but highly efficient trap for successfully catching rats and other cautious rodents. The combination of my elongated trap platform with the latch and trip mechanism requires the rodent to dispose the entire length of its body and weight upon the trap platform before the device may be tripped. The tripping mechanism being disposed at the forward end of the narrow lane, makes it impossible for the structure to be tripped without catching the rodent.

It will of course be understood that various changes may be made in the form, details, arrangement and proportions of the parts without departing from the scope of my invention.

What I claim is:

1. A rodent trap comprising structure defining a lane, a trap platform extending longitudinally at the bottom of said lane, a rotatably mounted shaft extending longitudinally of said lane, means for hinging said trap platform on said shaft, means for urging said trap platform to closed, substantially horizontal position, a latch for retaining said trap platform in closed position with the weight of a rodent supported thereon, a sensitive trip element fixedly secured to said shaft for rotating the same and disposed in said lane forwardly of said platform and in position to be engaged by the front portion of a rodent and latch actuating connections between said shaft and said latch for releasing said latch when said shaft is caused to rotate by a very light pressure being applied downwardly against said trip element.

2. A rodent trap comprising partition structure defining a lane slightly wider than the width of rodents to be trapped, a rotatably mounted shaft extending longitudinally of said lane, a trap platform extending longitudinally at the bottom of said lane and of a length at least twice its width, means for hinging said platform on said shaft, resilient means for urging said trap platform to closed, substantially horizontal position, a latch for retaining said platform in closed position with the weight of a rodent supported thereon, a trip element fixedly secured to said shaft for rotating the same and disposed in said lane in juxtaposition to one end of said platform, a trap entrance at the other end of said platform, said trip element being in position to be engaged by the front portion of a rodent and latch actuating linkage between said shaft and said latch.

3. A trap unit having in combination a pair of upstanding, substantially vertical partitions defining a lane, transverse bottom members for interconnecting said partitions to form a bodily removable unit, a shaft rotatably mounted on said unit and extending longitudinally along one side of said lane, a bait holder affixed to said unit and disposed between said partitions, a trap platform extending longitudinally at the bottom of said lane and hinged to said shaft, resilient means for urging said platform to substantially horizontal position, a latch for retaining said platform in substantially horizontal position with the weight of an animal disposed thereon, a sensitive trip element disposed within said lane and fixedly secured to said shaft for rotating the same, and latch actuating connections between said shaft and said latch for releasing said latch when shaid shaft is caused to rotate by light pressure being applied downwardly against said trip element.

4. The structure set forth in claim 3 wherein said trip element comprises a plate slightly less in width than the width of said lane and forming in cooperation with said platform, a bottom or floor for said lane and wherein said latch actuated connections are disposed below said trip element.

5. A trap comprising structure defining a lane, a trap platform extending longitudinally at the bottom of said lane and of a length greater than the length of animals to be caught in said trap, a rotatably mounted shaft extending longitudinally of said lane, means for hinging said platform on said shaft and adjacent one of the longitudinal edges of said platform, an animal-expelling flange secured in upstanding relation to said hinged longitudinal edge of said platform, means for urging said trap platform to substantially horizontal position, a latch for retaining said platform in such position with the weight of a rodent supported thereon, a sensitive trip element fixedly secured to said shaft for rotating the same and disposed in said lane forwardly of said platform in position to be engaged by the front portion of an animal and latch actuating connections between said shaft and said latch for releasing said latch when said shaft is caused to rotate by light pressure being applied vertically to said trip element.

6. The structure set forth in claim 5 wherein said latch includes a retractible rod carried below said platform and wherein said latch-actuating connections include a rigidly connected radial arm connected to said latch rod.

GUST LUNDQUIST.

REFERENCES CITED

The following references are of record in the file of this patent:

UNITED STATES PATENTS

| Number | Name | Date |
|---|---|---|
| 405,006 | Brawn | June 11, 1889 |
| 1,173,462 | Rayner | Feb. 29, 1916 |
| 1,495,882 | Caddy | May 27, 1924 |
| 1,618,636 | Bonchina | Feb. 22, 1927 |
| 2,333,651 | Holzknecht | Nov. 9, 1943 |